United States Patent
Moriguchi et al.

(10) Patent No.: US 7,729,821 B2
(45) Date of Patent: Jun. 1, 2010

(54) METHOD FOR MOUNTING PATTERN IN ACTUAL MACHINE

(75) Inventors: Toshiki Moriguchi, Nagaokakyo (JP); Takeshi Murakami, Kyoto (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 0 days.

(21) Appl. No.: 11/499,647

(22) Filed: Aug. 7, 2006

(65) Prior Publication Data

US 2007/0043484 A1 Feb. 22, 2007

(30) Foreign Application Priority Data

Aug. 17, 2005 (JP) ............................. 2005-236872

(51) Int. Cl.
*G01C 22/00* (2006.01)

(52) U.S. Cl. ........................... 701/25; 701/23; 701/200; 318/567; 318/568.1; 318/568.11; 318/568.12; 318/568.13; 318/568.17; 318/568.18

(58) Field of Classification Search ................... 701/25, 701/23, 200; 105/49; 180/167–169; 318/568.12, 318/567, 568.1, 568.11, 568.13, 568.17, 318/568.18

See application file for complete search history.

(56) References Cited

U.S. PATENT DOCUMENTS

| | | | | |
|---|---|---|---|---|
| 4,846,297 A | * | 7/1989 | Field et al. | 180/169 |
| 5,056,437 A | * | 10/1991 | Maddock | 104/88.03 |
| 5,138,560 A | * | 8/1992 | Lanfer et al. | 235/454 |
| 5,192,903 A | * | 3/1993 | Kita et al. | 318/587 |
| 5,229,941 A | * | 7/1993 | Hattori | 701/26 |
| 5,908,122 A | * | 6/1999 | Robinett et al. | 212/275 |
| 5,951,607 A | * | 9/1999 | Senn et al. | 701/1 |

(Continued)

FOREIGN PATENT DOCUMENTS

GB 2 267 696 A 12/1993

(Continued)

OTHER PUBLICATIONS

European Search Report dated Oct. 9, 2007 of the corresponding European Patent Application No. 06114114.9.

(Continued)

*Primary Examiner*—Khoi Tran
*Assistant Examiner*—Jorge O Peche
(74) *Attorney, Agent, or Firm*—Westerman, Hattori, Daniels & Adrian, LLP

(57) ABSTRACT

When dot-sequential data indicating a temporal variation in position, speed, or acceleration is stored in a memory in an automated guided vehicle as it is, the capacity of the memory is insufficient and thus needs to be increased. A pattern is mounted in a stacker crane 1; the pattern is drawn by dot-sequential data indicating a temporal variation in acceleration (FIG. 2C), and corresponds to an instruction value provided to an actuator installed in the stacker crane 1. In this case, a curve function corresponding to an approximate expression for the dot-sequential data is derived in a form of a Fourier series having a finite number of terms and using time as an independent variable and the position, speed, or acceleration as a dependent variable. Data identifying the Fourier series, having a finite number of terms, is stored in a memory 5 mounted in the stacker crane 1.

3 Claims, 3 Drawing Sheets

U.S. PATENT DOCUMENTS

| | | | |
|---|---|---|---|
| 6,151,791 A * | 11/2000 | Shimazutsu et al. | 33/552 |
| 6,192,294 B1 * | 2/2001 | Chiba | 700/214 |
| 6,374,748 B1 * | 4/2002 | Shiwaku et al. | 104/243 |
| 6,452,158 B1 * | 9/2002 | Whatley et al. | 250/231.13 |
| 6,535,790 B2 * | 3/2003 | Nakano et al. | 700/214 |
| 6,644,208 B2 * | 11/2003 | Akiyama | 104/130.01 |
| 6,742,107 B2 * | 5/2004 | Jinzaki | 712/200 |
| 7,200,479 B2 * | 4/2007 | Smakman et al. | 701/70 |
| 7,303,169 B2 * | 12/2007 | Hori et al. | 246/122 R |
| 7,426,424 B2 * | 9/2008 | Moriguchi | 700/214 |
| 7,529,604 B2 * | 5/2009 | Moriguchi | 701/23 |
| 2002/0021955 A1 * | 2/2002 | Kawaguchi | 414/278 |
| 2002/0033319 A1 * | 3/2002 | Fukushima | 198/570 |
| 2002/0104726 A1 * | 8/2002 | Kuzuya | 191/6 |
| 2002/0157562 A1 * | 10/2002 | Akiyama | 104/130.01 |
| 2003/0229416 A1 * | 12/2003 | Tai et al. | 700/213 |
| 2005/0021196 A1 * | 1/2005 | Moriguchi | 701/23 |
| 2005/0038575 A1 * | 2/2005 | Wu | 701/19 |
| 2005/0137772 A1 * | 6/2005 | Smakman et al. | 701/70 |
| 2005/0150416 A1 * | 7/2005 | Hori et al. | 105/49 |
| 2005/0203699 A1 * | 9/2005 | Moriguchi | 701/200 |

FOREIGN PATENT DOCUMENTS

| | | |
|---|---|---|
| GB | 2267696 A * | 12/1993 |
| JP | 60-112106 | 6/1985 |
| JP | 03-264182 A | 11/1991 |
| JP | 09-016240 A | 1/1997 |
| JP | 11-157613 A | 6/1999 |
| JP | 2002-032124 | 1/2002 |
| JP | 2002032124 A * | 1/2002 |

OTHER PUBLICATIONS

Notification of Reason(s) for Refusal of the Japanese Patent Application No. 2005-236872, dated Apr. 28, 2008, which is the application based on the priority claim, received from the Japanese Patent Office.

* cited by examiner

METHOD FOR MOUNTING PATTERN IN ACTUAL MACHINE

FIELD OF THE INVENTION

The present invention relates to a method for mounting a pattern in an automated guided vehicle; the pattern is drawn by dot-sequential data indicating a temporal variation in position, speed, or acceleration, and the pattern corresponds to an instruction value provided to an actuator installed in the automated guided vehicle.

BACKGROUND OF THE INVENTION

To controllably run (move) an automated guided vehicle such as an automated guided stacker crane, an instruction value for position, speed, or acceleration needs to be provided to a motor (actuator) installed in the automated guided vehicle; the instruction value depends on a temporal variation in position, speed, or acceleration.

For example, where an instruction value for the speed is provided to the motor to run the automated guided vehicle over a given section, the corresponding speed pattern is normally set to draw a trapezoidal curve. The trapezoidal curve consists of three portions, an accelerated running portion (hypotenuse) in which the automated guided vehicle runs at a uniform acceleration, a uniform-speed portion (top side), and a decelerated running portion (hypotenuse) in which the automated guided vehicle runs at a uniform acceleration.

The Unexamined Japanese Patent Application Publication (Tokkai) No. 2002-32124 discloses an automated guided vehicle (rail guided carriage) for which a speed pattern is set to draw a trapezoidal curve.

To reduce vibration in the automated guided vehicle, an optimum control problem for maximizing vibration controllability may be solved to obtain a curve function corresponding to the optimum solution and used as a speed pattern for the automated guided vehicle. It is known that vibration can be effectively controlled by using the thus derived speed pattern (hereinafter referred to as an optimum speed pattern) to control the speed of the automated guided vehicle. This optimum speed pattern draws a complicated curve instead of the normal trapezoidal curve.

Further, although depending on what is to be optimized in the optimum control problem, where it is difficult to derive the optimum solution in the form of a continuous function, an approximate solution may be found every period of time t, that is, at given time intervals t, to derive the optimum speed V every period of time t. This results in dot-sequential data composed of dots P (t, V) where the elements of each dot are time t and speed V. The dot-sequential data forms an optimum speed pattern that is a continuous curve.

Where the optimum speed pattern is expressed by dot-sequential data, the dot-sequential data needs to be stored in a memory in the automated guided vehicle in order to run the automated guided vehicle in accordance with the optimum speed pattern. However, such dot-sequential data occupies a large space in the memory in the automated guided vehicle, the capacity of which must thus be increased in order to achieve the proper storage. For example, when instructions are given to the actuator such as a motor at the rate of one instruction per $1/1{,}000$ sec., 1,000 data for each second needs to be pre-stored in the memory.

Furthermore, the optimum speed pattern varies depending on the distance that the automated guided vehicle runs or the position of center of gravity of the automated guided vehicle. For example, for a stacker crane, the distance that the stacker crane runs to transfer an article varies depending on the positional relationship between the source and destination of the article. Thus, to allow the same automated guided vehicle to run different distances, many dot-sequential data the number of which depends on the running distances needs to be stored in the memory in the automated guided vehicle. This further increases the amount of data to be stored in the memory.

Thus, a problem to be solved by the present invention is that when dot-sequential data indicating a temporal variation in position, speed, or acceleration is stored in the memory in the automated guided vehicle as it is, the capacity of the memory is insufficient and thus needs to be increased.

SUMMARY OF THE INVENTION

A description has been given of the problem to be solved by the present invention. Now, a description will be given of means for solving the problem.

According to Claim 1, the present invention provides a method for actually mounting a pattern in an automated guided vehicle, the pattern being drawn by dot-sequential data indicating a temporal variation in position, speed, or acceleration, the pattern corresponding to an instruction value provided to an actuator installed in the automated guided vehicle, wherein a curve function corresponding to an approximate expression for the dot-sequential data is derived in a form of a finite series that uses time as an independent variable and the position, speed, or acceleration as a dependent variable, and data identifying the finite series is stored in a memory mounted in the automated guided vehicle.

The pattern drawn by the dot-sequential data refers to a locus drawn by the entire dot-sequential data. However, this does not limit the locus to either a continuous or discontinuous curve.

A general approximation method may be used to derive the curve function corresponding to an approximate expression for the dot-sequential data, in the form of a finite series, and the deriving method is not limited.

Any of various general series expansion methods can be used to derive a finite series. The data identifying a finite series means coefficients for the terms constituting the finite series, a coefficient by which the independent variable is multiplied, a constant that determines the phase of the independent variable, and the like.

Mounting the pattern in the actual machine means storing the pattern in the automated guided vehicle itself. This expression does not mean storing the pattern in an external device located outside and communicatively connected to the automated guided vehicle.

The element (position, speed, acceleration) corresponding to an instruction value provided to the actuator need not necessarily be the same as the element (position, speed, acceleration) of the finite series stored in the memory. Once a function in the form of a finite series is derived from the dot-sequential data, another element can be easily derived by differentiation or integration: the speed or position can be derived from the acceleration or the acceleration or position can be derived from the speed.

The method for mounting a pattern in an actual machine according to Claim 2, according to Claim 1, wherein the finite series is a Fourier series having a finite number of terms.

Where the finite series is a Fourier series having a finite number of terms, the data identifying a finite series corresponds to the coefficients constituting the finite series and a frequency in each term corresponding to a coefficient by which the time as an independent variable is multiplied.

The above configuration produces the following effects.

Where the terms constituting a Fourier series are arranged in order of decreasing coefficient (frequency) by which the time as an independent variable is multiplied, they are simultaneously arranged in order of increasing level of effects on reproduction of the pattern.

Where the terms constituting the Fourier series are considered to be waves, the frequency on which each of the terms acts is clearly determined.

The method for mounting a pattern in an actual machine according to Claim 3 according to Claim 1 or 2 configured as follows.

The dot-sequential data is divided into a plurality of parts, and the finite series is derived for each of the resulting parts. Coefficients for the terms constituting the finite series for each of the parts are stored in the memory. In particular, for one of the plurality of parts in which the automated guided vehicle makes only uniform motion, a constant indicating the position or speed or acceleration is stored in the memory instead of the coefficients for the finite series.

The present invention exerts the following effects.

According to Claim 1, the present invention avoids storing the dot-sequential data on acceleration or the like in the memory as it is and instead stores the data identifying a finite series corresponding to an approximate expression for the dot-sequential data. This reduces the amount of data stored in the memory. Therefore, the capacity of the memory need not be increased.

Claim 2 produces not only the effects of Claim 1 but also the following.

It is easy to identity a term having a high level of effects on reproduction of the pattern of acceleration or the like. The accuracy of the approximation can thus be increased while reducing the number of terms in the finite series.

For a Fourier series for acceleration, the terms of the Fourier series correspond to the components of an inertia force periodically exerted on the automated guided vehicle. This makes it possible to predict whether or not resonance or heavy vibration will occur in the automated guided vehicle.

Claim 3 produces not only the effects of Claim 1 or 2 but also the following. Where the data can be approximated without the need for expansion into a finite series, the amount of data stored in the memory can further be reduced.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 2A shows a temporal variation in position, FIG. 2B shows a temporal variation in speed, and FIG. 2C shows a temporal variation in acceleration.

DETAILED DESCRIPTION OF THE PREFERRED EMBODIMENTS

A description will be given of a method for mounting dot-sequential data in an actual machine.

The present mounting method mounts dot-sequential data in an automated guided vehicle, the data corresponding to an instruction value provided to an actuator installed in the automated guided vehicle.

Here, the automated guided vehicle means a vehicle that can automatically run and includes a vehicle running directly on a floor or on a rail installed on the floor or in the air. The actuator such as a motor is mounted in the automated guided vehicle as a driving source for wheels. In the present embodiment, the automated guided vehicle is a stacker crane 1 running on the floor.

The dot-sequential data corresponding to an instruction value provided to the actuator constitutes a position, speed, or acceleration pattern. The instruction value for the actuator varies depending on the actuator. The instruction value is not limited to one for speed but may be one for position or acceleration.

Mounting the dot-sequential data in the automated guided vehicle means storing the data in a memory installed in the automated guided vehicle and not in a device located outside the automated guided vehicle.

Figure 1:
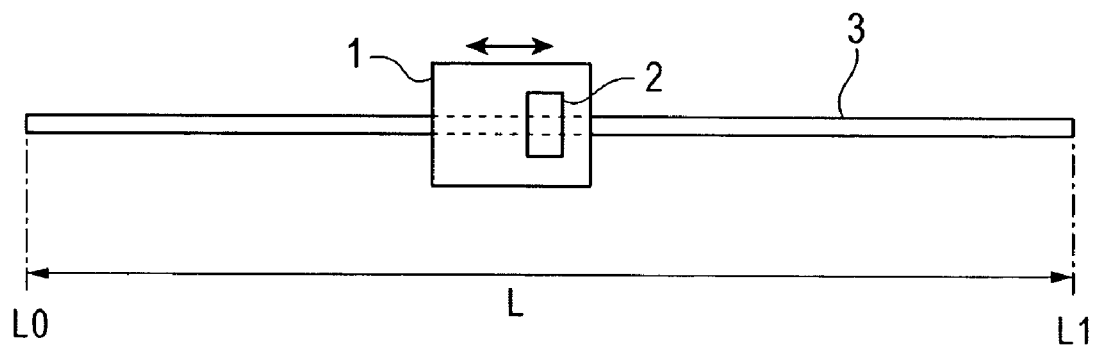
FIG. 1 is a diagram showing a stacker crane and its running section.

FIG. 1 shows a stacker crane 1 and its running section L.

The stacker crane 1 comprises a motor 2 serving as a driving source for running, and the stacker crane 1 can run along a rail 3 fixed to a floor, by means of wheels rotatively driven by the motor 2.

It is assumed that the stacker crane 1 is run from a start position L0 at one end of the running section L to an end position L1 at the other end. The stacker crane 1 is stopped at the start position L0, and upon reaching the end position L1, the stacker crane 1 is stopped again. Thus, to run over the running section L, the stacker crane 1 is first accelerated and then decelerated to a stop.

Figure 2:
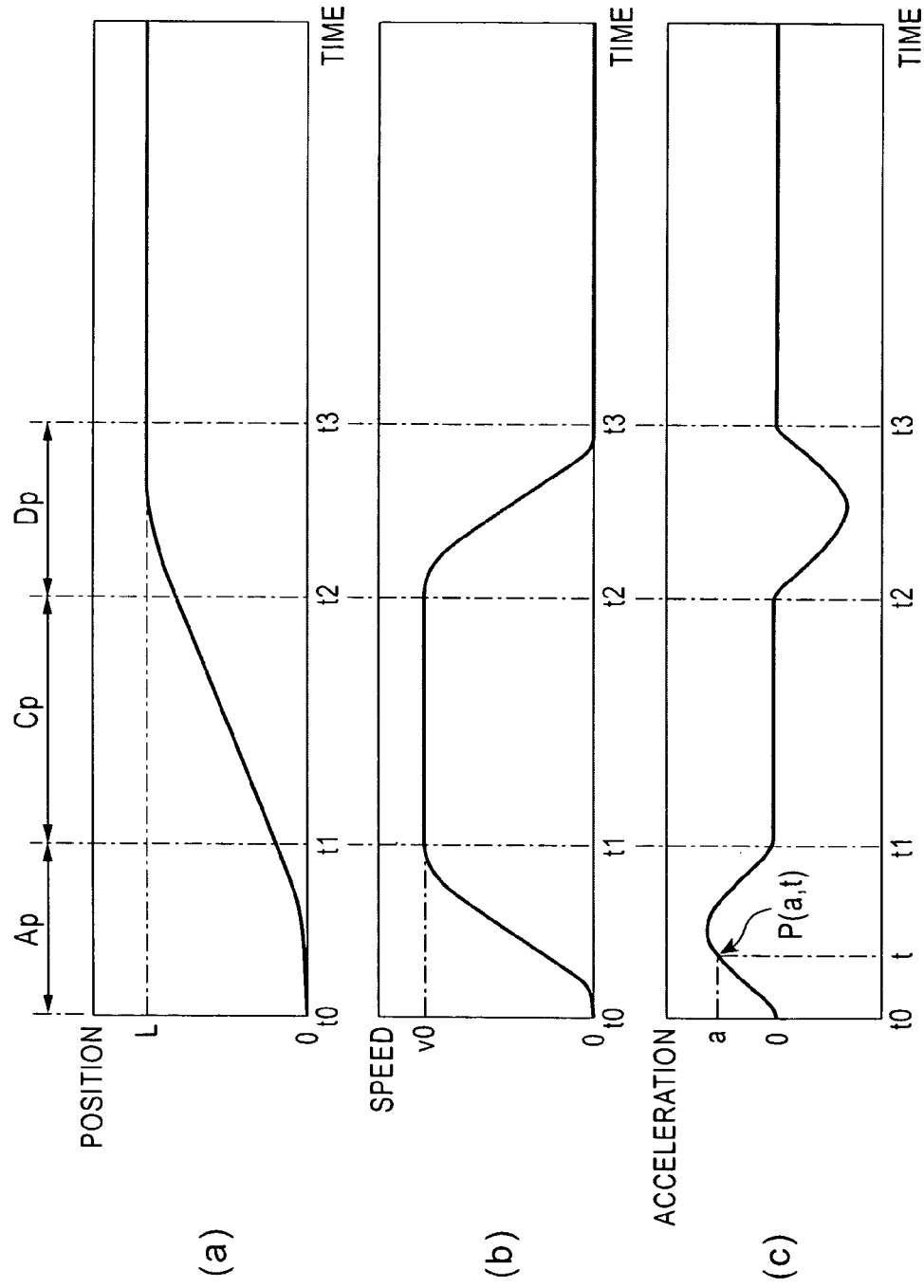
FIG. 2 is a diagram showing temporal variations in the position, speed, and acceleration of a stacker crane 1 which correspond to instruction values provided to a driving motor for the stacker crane.

FIG. 2 shows temporal variations in the position, speed, and acceleration of the stacker crane 1 which serve as instruction values provided to a motor 2. FIG. 2A shows a position pattern (temporal variation in position) where the axis of abscissa indicates time, while the axis of ordinate indicates position (running distance from the start position L0 corresponding to an origin). FIG. 2B shows a-speed pattern (temporal variation in speed) where the axis of abscissa indicates time, while the axis of ordinate indicates speed. FIG. 2C shows an acceleration pattern (temporal variation in acceleration) where the axis of abscissa indicates time, while the axis of ordinate indicates acceleration.

Naturally, the temporal variation in the position pattern in FIG. 2A corresponds to the temporal variation in the speed pattern in FIG. 2B. The temporal variation in the speed pattern in FIG. 2B corresponds to the temporal variation in the acceleration pattern in FIG. 2C.

The configuration of the motor 2 determines which of the position, speed, and acceleration, each corresponding to an instruction value, is provided to the motor 2.

At a time t0 (FIG. 2) corresponding to the start of running, the stacker crane 1 is located at the start position L0 (FIG. 1), and its speed and acceleration are both zero (FIG. 2). At a time t3 (FIG. 2) is a finish time for running of the stacker crane 1. At this time, the stacker crane 1 is stopped at the end position L1 (FIG. 1).

As shown in FIG. 2B, the speed pattern of the stacker crane 1 is trapezoidal but draws a smooth curve.

When the motor 2 is drivingly controlled using this speed pattern, the stacker crane 1 is accelerated between time t0 and time t1. The stacker crane 1 then runs at a uniform speed between time t1 and time t2. The stacker crane 1 is then decelerated between time t2 and time t3. The position pattern is as shown in FIG. 2A, and the acceleration pattern is as shown in FIG. 2C. In each of the figures, the pattern consists of an accelerated running portion Ap between the time t0 and time t1, a uniform-speed running portion Cp between the time t1 and time t2, and a decelerated running portion Dp between the time t2 and time t3.

Where the instruction value provided to the motor 2 is for position, the motor 2 is drivingly controlled using the position pattern shown in FIG. 2A. However, also in this case, the position, speed, and acceleration of the stacker crane 1 during running vary as shown in FIG. 2.

This also applies to the case where the instruction value provided to the motor 2 is for acceleration. The position, speed, and acceleration of the stacker crane 1 during running vary as shown in FIG. 2.

In the present embodiment, the position, speed, and acceleration patterns shown in FIG. 2 are each obtained by solving an optimum control problem for maximizing vibration controllability. Vibration is suppressed during running of the stacker crane 1 by driving the motor 2 using an instruction value based on the pattern obtained by the optimum control.

As shown in FIG. 2C, maximized vibration controllability allows the formation of a smooth acceleration pattern. Where the speed pattern is set to draw a trapezoidal curve as in the prior art, the acceleration varies step by step and changes discontinuously and rapidly at the junction between the accelerated running and the uniform-speed running or between the uniform-speed running and the decelerated running. Then, in the stacker crane running in accordance with this speed pattern, a significant change in acceleration, that is, a significant change in inertia force, results in heavy vibration. This problem is prevented by such a smooth acceleration pattern as shown in FIG. 2C.

The position, speed, acceleration patterns shown in FIG. 2 are not continuous curves but correspond to loci drawn by dot-sequential data. However, this does not limit the loci to continuous or discontinuous curves.

These patterns are obtained as the optimum solutions of the optimum control problem as previously described. However, where it is difficult to derive the optimum solutions in the form of continuous functions for time, the optimum solutions corresponding to discontinuous curves are found by approximation.

Where the position, speed, or acceleration is derived every period of time in order to achieve approximation with minimized errors, dot-sequential data indicating the position, speed, or acceleration is obtained every period of time. Collection of these dot-sequential data forms patterns corresponding to discontinuous curves.

In the present embodiment, as described above, each of the position, speed, and acceleration patterns is composed of dot-sequential data as described above. In the present invention, dot-sequential data need not necessarily be created on the basis of the optimum solution for the optimum control previously described.

Figure 3:
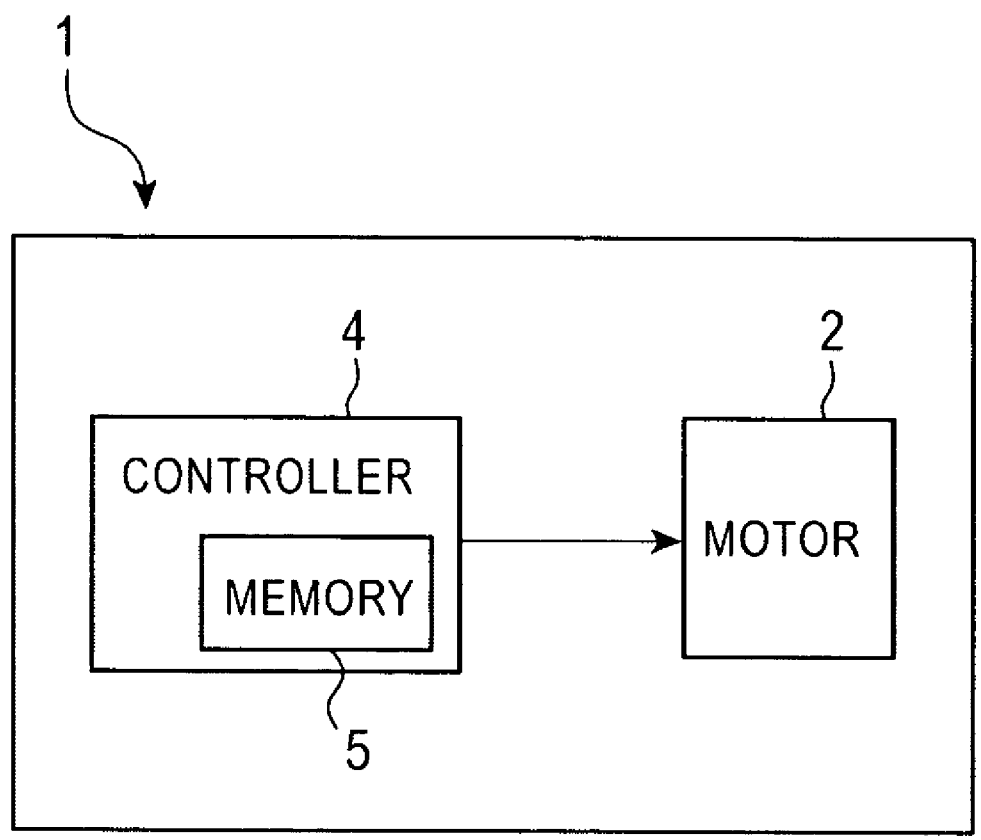
FIG. 3 is a block diagram relating to motor control for a running system in the stacker crane.

As shown in FIG. 3, the stacker crane 1 comprises a controller 4 that drivingly controls the motor 2 and a memory 5 is provided in the controller 4.

Dot-sequential data corresponding to an instruction value for the motor 2 is stored in the memory 5, and the motor 2 can be drivingly controlled on the basis of the dot-sequential data.

As shown in FIG. 2C, for dot-sequential data on acceleration, data on each of the dots P(t, a) constituting the dot-sequential data contains information on a time t and acceleration (a) at the time t. The dot sequence is composed of, for example, a collection of dots (t, a) for the respective points in time in $1/1,000$ sec increments.

However, it is often difficult to store (mount) dot-sequential data in the memory as it is, because of the capacity of the memory 5. A larger number of dots constituting the dot-sequential data improve the accuracy of a pattern composed of the dot-sequential data, and thus, for example, vibration controllability. However, this is inconsistent with a reduction in the amount of data.

Thus, where an acceleration pattern is provided in the form of dot-sequential data, a function corresponding to an approximate expression for the acceleration pattern is stored in the memory 5 instead of the dot-sequential data itself. This function uses the time as an independent variable and the acceleration as a dependent variable. Substituting a time as a variable into the function enables the acceleration at that time to be determined.

This also applies to the case where a position or speed pattern is provided in the form of dot-sequential data.

The function stored in the memory 5 instead of dot-sequential data is an approximate expression for the dot-sequential data, that is, a curve function expressed as a finite series. The finite series uses time as an independent variable and acceleration (position or speed) as a dependent variable.

It is well-known how to derive a curve function expressed as a finite series and corresponding to an approximate expression for dot-sequential data. Thus, in the present specification, a description of this method is omitted.

In particular, to derive an approximate expression for dot-sequential data, the present embodiment uses a Fourier series having a finite number of terms, as the finite series.

Depending on the general shape of an acceleration pattern or the like, it is not always necessary to determine a finite series that reproduces the entire pattern but is more efficient to find a finite series corresponding to an approximate expression for each part of the pattern.

For an acceleration pattern (FIG. 2C), the accelerated running portion Ap and the decelerated running portion Dp are linearly symmetric with respect to the time axis. Accordingly, deriving a finite series for the accelerated running portion Ap enables a finite series for the decelerated running portion Dp to be easily determined. Where the finite series for the accelerated running portion Ap is expressed by f(t-t0) as a function for the time t, the finite series for the decelerated running portion Dp is similarly expressed by −f(t-t3) as a function for the time t. As previously described, at the time t0, the stacker crane 1 starts running. At the time t3, the stacker crane 1 ends running. Also for a position pattern (FIG. 2A) or speed pattern (FIG. 2B), on the basis of the symmetry, the finite series for the accelerated running portion Ap can be used to easily determine a finite series for the decelerated running portion Dp.

For the uniform-speed running portion Cp, a finite series reproducing this portion need not be determined. In the uniform-speed running portion Cp, the acceleration is always zero, and the speed is at a fixed value for a maximum speed V0, and the position is expressed as a linear function having an inclination corresponding to the maximum speed V0.

The present embodiment stores, in the memory 5, a finite Fourier series corresponding to an approximate expression for an acceleration pattern.

As previously described, in the acceleration pattern, the accelerated running portion Ap and the decelerated running portion Dp are symmetric. Accordingly, a finite Fourier series is derived which corresponds to an approximate expression for the accelerated running portion Ap. The derived finite Fourier series is given by the following equation.

$$\ddot{x}(t) = \frac{a_0}{2} + \sum_{i=1}^{N} \{a_i \cos(2\pi \text{ fi} t) + b_i \sin(2\pi \text{ fi} t)\} \quad \text{[Equation 1]}$$

In Equation 1, ai (i is any of 1 to N) is a coefficient for a cosine function $\cos(2\pi \cdot fi \cdot t)$, and bi (i is any of 1 to N) is a coefficient for a sine function $\sin(2\pi \cdot fi \cdot t)$. The frequency fi has a relation fi (i is any of 1 to N)=i·f1. f1 is a basic frequency. a0 is a correction coefficient, and N is a natural number.

Where N=10, data required to identify Equation 1, which corresponds to a finite Fourier series, contains the following 22 numerical values:

10 coefficients ai (corresponding to N=10), 10 coefficients bi (corresponding to N=10), 1 coefficient a0, and 1 basic frequency f1.

When these 21 coefficients (ai, bi, a0) and 1 basic frequency f1 are stored in the memory 5 as data identifying the finite Fourier series, the controller 4 can identify the finite Fourier series, which corresponds to an approximate expression for the acceleration pattern. The controller 4 stores, for example, a calculation program for a trigonometric function or a program that allows a Fourier series having a finite number of terms to be identified by identifying numerical values such as coefficients and a basic frequency.

The controller 4 substitutes the current time into the finite Fourier function to calculate the acceleration corresponding to the current time, and the controller 4 then transmits the calculated acceleration to the motor 2 as an instruction value to drivingly control the motor 2. The controller 4 thus controls the acceleration of the stacker crane 1 in accordance with the acceleration pattern-corresponding to Equation 1.

Where the finite Fourier function for acceleration (Equation 1) has been identified by the controller 4, that is, where the 22 data are stored in the memory 5, the controller 4 can also identify a finite Fourier function for speed (Equation 2) and a finite Fourier function for position (Equation 3).

Equation 2 is a series derived by executing an indefinite integral for time on Equation 1. Equation 3 is a series derived by executing an indefinite integral for time on Equation 2.

$$\dot{x}(t) = \frac{a_0}{2}t + \sum_{i=1}^{N} \left\{ \frac{a_i}{2\pi fi} \sin(2\pi \text{ fi} t) - \frac{b_i}{2\pi fi} \cos(2\pi \text{ fi} t) \right\} + C_1 \quad \text{[Equation 2]}$$

$$x(t) = \frac{a_0}{4}t^2 - \quad \text{[Equation 3]}$$
$$\sum_{i=1}^{N} \left\{ \frac{a_i}{(2\pi fi)^2} \cos(2\pi \text{ fi} t) + \frac{b_i}{(2\pi fi)^2} \sin(2\pi \text{ fi} t) \right\} + C_1 t + C_2$$

Here, C1 in Equation 2 and C2 in Equation 3 are integral constants determined on the basis of an initial condition for the stacker crane 1 running over the running section L, as shown below in Equations 4 and 5. The initial condition is that both speed and acceleration are zero at the time t0.

$$C_1 = \sum_{i=1}^{N} \frac{b_i}{2\pi fi} \quad \text{[Equation 4]}$$

$$C_2 = \sum_{i=1}^{N} \frac{a_i}{(2\pi fi)^2} \quad \text{[Equation 5]}$$

As described above, the controller 4 can identify the finite Fourier series for speed (Equation 2) or the finite Fourier series for position (Equation 3) by storing the data required to identify the finite Fourier series for acceleration (Equation 1) (21 coefficients (ai, bi, a0) and 1 basic frequency f1), in the memory 5 as data identifying a finite series.

Thus, to control the motor 2, the present embodiment avoids storing the dot-sequential data on acceleration or the like in the memory 5 as it is and instead stores the data identifying a finite series corresponding to an approximate expression for the dot-sequential data. This reduces the amount of data stored in the memory 5. Therefore, the capacity of the memory 5 need not be increased.

Naturally, the shape of the acceleration pattern or the like varies depending on the distance of the running section L of the stacker crane 1. Thus, where the same stacker crane 1 is run over different distances, many acceleration patterns or the like need to be prepared the number of which depends on the running distances.

Where these patterns are expressed as dot-sequential data, the number of dot-sequential data stored in the memory 5 needs to be equal to that of the required patterns. This makes the capacity of the memory 5 more insufficient. However, storage of data identifying a finite series originally involves a smaller amount of data. Consequently, storing even plural such data (identifying a finite series) in the memory 5 does not require the capacity of the memory 5 to be increased.

Moreover, the finite series stored in the memory 5 is a Fourier series having a finite number of terms. This makes it possible to easily identify a term having a high level of effects on reproduction of an acceleration pattern or the like, and the accuracy of the approximation can thus be increased while reducing the number of terms in the finite series.

In a Fourier series composed of overlapping trigonometric functions, terms of the trigonometric functions which include larger periods (terms with a smaller N in Equation 1) are advantageous in reproduction of an acceleration pattern or the like. Consequently, by extracting only those terms of the trigonometric functions which include larger periods to construct a finite series, it is possible to obtain a finite series with a high approximation accuracy while reducing the number of terms.

Further, since the finite series is a Fourier series, when acceleration or deceleration is carried out on the basis of the finite series, it is possible to predict whether or not resonance will occur in the automated guided vehicle (stacker crane 1).

Resonance occurs for the following reason.

When the stacker crane 1 is drivingly accelerated or decelerated by the motor 2, an inertia force acts on the stacker crane 1. The inertia force may cause resonance in the stacker crane 1. Resonance occurs in the stacker crane 1 where the stacker crane 1, a structure, is subjected to a force with a frequency equal to the natural frequency of the stacker crane 1. The inertia force resulting from the acceleration or deceleration can be considered to be plural overlapping forces (hereinafter refereed to as partial forces). Where any of these partial forces acts at a frequency equal to the natural frequency of the stacker crane 1, this partial force is maximally absorbed by the stacker crane 1, and this maximizes the vibration of the stacker crane 1 (resonance occurs).

In a finite Fourier series (Equation 1) approximating an acceleration pattern, the terms of the finite Fourier series indicate the components of the acceleration. The acceleration indicated by each term is added to the mass of the stacker crane 1 to obtain the corresponding partial force.

Excepting the constant term ($a0/2$), the terms of the finite Fourier series in Equation 1 are $ai \cdot \cos(2\pi \cdot fi \cdot t)$ and $bi \cdot \sin(2\pi \cdot fi \cdot t)$, and are acceleration terms corresponding to vibration at the frequency $fi$.

When the controller 4 controls the motor 2 on the basis of the finite Fourier series shown in Equation 1, where any frequency $fi$, that is, any of the frequencies $f1$ to $fN$, is equal to the natural frequency of the stacker crane 1, resonance occurs in the running stacker crane 1. If any frequency $fi$, that is, any of the frequencies $f1$ to $fN$, is close to but not equal to the natural frequency of the stacker crane 1, then instead of resonance, heavy vibration occurs in the running stacker crane 1.

As described above, an acceleration pattern is expressed as a finite Fourier series. Thus, when the acceleration of the stacker crane 1 is controlled using the acceleration pattern, it is possible to predict whether or not resonance or heavy vibration occurs in the stacker crane 1.

Thus, the natural frequency of the stacker crane 1, a structure, is checked against the finite Fourier series expressing the acceleration pattern for the stacker crane 1. Then, where the check results indicate that resonance or intense vibration is likely to occur, possible defects can be prevented by, for example, appropriately changing the position of center of gravity of the stacker crane 1 or the acceleration pattern.

In the present embodiment, each pattern for acceleration or the like is composed of the accelerated running portion Ap, uniform-speed running portion Cp, and decelerated running portion Dp. The stacker crane 1 carries out accelerated, uniform-speed, and decelerated running to run over the running section L. However, the present invention is not limited to this configuration. Depending on the length of the running section L, the pattern may be free from the uniform-speed running portion and may be composed only of the accelerated and decelerated running portions.

While the present invention has been-described with respect to preferred embodiments thereof, it will be apparent to those skilled in the art that the disclosed invention may be modified in numerous ways and may assume many embodiments other than those specifically set out and described above. Accordingly, it its intented by the appended claims to cover all modifications of the present invention that fall within the true spirit and scope of the invention.

The invention claimed is:

1. A method for mounting a pattern in an automated guided vehicle, the pattern being drawn by dot-sequential data indicating a temporal variation in acceleration, the pattern corresponding to an instruction value provided to an actuator installed in the automated guided, comprising:

deriving a curve function expressed as a finite series corresponding to an approximate expression for the dot-sequential data, said curve function uses time as an independent variable and the acceleration as a dependent variable;

dividing the dot-sequential data into a plurality of parts to derive the finite series for each of the plurality of parts, said plurality of parts correspond to the pattern drawn by the dot-sequential data indicating the temporal variation in the acceleration, wherein the plurality of parts represent an accelerated running portion, a uniform-speed running portion and a decelerated running portion;

storing, in a memory mounted in the automated guided vehicle, coefficients of terms constituting the finite series for the accelerated running portion and the decelerated running portion, and storing a constant in the memory indicating the temporal variation in acceleration, instead of the coefficients of the terms constituting the finite series for the uniform-speed running portion, wherein controlling the automated guided vehicle based on the data for the finite series for the accelerated running portion and the decelerated running portion and the constant for the uniform-speed running portion stored in the memory.

2. The method for mounting a pattern in an actual machine according to claim 1, wherein the finite series is a Fourier series having a finite number of terms.

3. The method for mounting a pattern in an actual machine according to claim 1, wherein said temporal variation is in position or speed.

* * * * *